(12) United States Patent
Wei et al.

(10) Patent No.: US 10,500,716 B2
(45) Date of Patent: Dec. 10, 2019

(54) MULTI-FUNCTIONAL HOME SERVICE ROBOT

(71) Applicant: Beijing Evolver Robotics Co., LTD, Haidian District, Beijing (CN)

(72) Inventors: Ran Wei, Beijing (CN); Wei Wang, Beijing (CN); Qingyun Xu, Beijing (CN); Tao Qiao, Beijing (CN); Jinwen Hou, Beijing (CN); Xifeng Zhou, Beijing (CN)

(73) Assignee: Beijing Evolver Robotics Co., Ltd., Beijing (CN)

( * ) Notice: Subject to any disclaimer, the term of this patent is extended or adjusted under 35 U.S.C. 154(b) by 211 days.

(21) Appl. No.: 15/522,820

(22) PCT Filed: Jul. 22, 2016

(86) PCT No.: PCT/CN2016/091034
§ 371 (c)(1),
(2) Date: Apr. 28, 2017

(87) PCT Pub. No.: WO2017/020734
PCT Pub. Date: Feb. 9, 2017

(65) Prior Publication Data
US 2017/0326724 A1    Nov. 16, 2017

(30) Foreign Application Priority Data

Apr. 8, 2015 (CN) .......................... 2015 1 0472661
Apr. 8, 2015 (CN) ..................... 2015 2 0580708 U (51) Int. Cl.
*G06F 19/00* (2018.01)
*B25J 9/00* (2006.01)
(Continued)

(52) U.S. Cl.
CPC ............. *B25J 9/0003* (2013.01); *B25J 5/007* (2013.01); *B25J 11/0005* (2013.01);
(Continued)

(58) Field of Classification Search
CPC ........ B25J 9/0003; B25J 5/007; B25J 11/008; B25J 13/08; G06F 3/0412; G06F 3/04812; G06F 3/0488
(Continued)

(56) References Cited

U.S. PATENT DOCUMENTS 6,353,814 B1 * 3/2002 Weng ................. G05B 13/0265
700/258
6,760,645 B2 * 7/2004 Kaplan ................... A63H 11/00
318/568.1
(Continued)

FOREIGN PATENT DOCUMENTS

CN      201073550 Y     6/2008
CN      104690732       6/2015
(Continued)

*Primary Examiner* — Ronnie M Mancho
(74) *Attorney, Agent, or Firm* — Bay State IP, LLC (57) ABSTRACT

Disclosed is a home service robot, comprising an intelligent control system, a mechanical structure and a remote control terminal. The intelligent control system is mounted in the mechanical structure, and the intelligent control system is controlled by the remote control terminal, to cause the mechanical structure to act correspondingly. The mechanical structure comprises a head (1), a body (2), a chassis (7), a chassis suspension protection and movement mechanism and two movable moving-wing mechanisms (4). The head (1) is mounted at an upper end of the body (2), and the body (2) is mounted on the chassis (7); the two moving-wing mechanisms (4) are symmetrically mounted on two sides of the body (2), and the chassis suspension protection and
(Continued)

movement mechanism is mounted on the bottom of the chassis (7). The robot has multiple functions.

9 Claims, 10 Drawing Sheets

(51) Int. Cl.
*B25J 5/00* (2006.01)
*B25J 13/08* (2006.01)
*G06F 3/041* (2006.01)
*B25J 11/00* (2006.01)
*G06F 3/0488* (2013.01)
*G06F 3/0481* (2013.01)

(52) U.S. Cl.
CPC ............ *B25J 11/008* (2013.01); *B25J 13/08* (2013.01); *G06F 3/0412* (2013.01); *G06F 3/0488* (2013.01); *G06F 3/04812* (2013.01)

(58) Field of Classification Search
USPC ........................................................ 700/245
See application file for complete search history.

(56) References Cited

U.S. PATENT DOCUMENTS

| | | | | |
|---|---|---|---|---|
| 7,289,884 B1 * | 10/2007 | Takahashi | ............. | B25J 9/1612 |
| | | | | 700/245 |
| 7,720,572 B2 * | 5/2010 | Ziegler | ............. | B25J 5/007 |
| | | | | 700/245 |
| 7,720,775 B2 * | 5/2010 | Shimomura | ....... | G06K 9/00281 |
| | | | | 700/245 |
| 8,380,348 B2 * | 2/2013 | Neki | ................. | B25J 19/005 |
| | | | | 219/125.1 |
| 8,862,271 B2 * | 10/2014 | Shamlian | ............. | G05D 1/0238 |
| | | | | 700/259 |
| 2002/0050802 A1 * | 5/2002 | Inoue | ................. | B25J 13/00 |
| | | | | 318/560 |
| 2005/0256611 A1 * | 11/2005 | Pretlove | ............. | B25J 9/1664 |
| | | | | 700/264 |
| 2007/0061041 A1 * | 3/2007 | Zweig | ............. | G05D 1/0261 |
| | | | | 700/245 |
| 2007/0192910 A1 * | 8/2007 | Vu | ............. | B25J 5/007 |
| | | | | 700/245 |
| 2008/0147239 A1 * | 6/2008 | Chiang | ............. | B25J 13/084 |
| | | | | 700/264 |
| 2008/0302200 A1 * | 12/2008 | Tobey | ............. | B25J 5/007 |
| | | | | 74/490.02 |
| 2009/0132088 A1 * | 5/2009 | Taitler | ............. | G05B 19/42 |
| | | | | 700/264 |
| 2010/0236046 A1 * | 9/2010 | Lundberg | ............. | B23P 21/004 |
| | | | | 29/430 |
| 2011/0015787 A1 * | 1/2011 | Tsusaka | ............. | B25J 9/0003 |
| | | | | 700/264 |
| 2012/0072023 A1 * | 3/2012 | Ota | ............. | B25J 9/1664 |
| | | | | 700/259 |

FOREIGN PATENT DOCUMENTS

| | | |
|---|---|---|
| CN | 105034002 A | 11/2015 |
| CN | 204976641 U | 1/2016 |

\* cited by examiner

MULTI-FUNCTIONAL HOME SERVICE ROBOT

CROSS REFERENCE TO RELATED APPLICATION

This application is for entry into the U.S. National Phase under § 371 for International Application No. PCT/CN2016/091034 having an international filing date of Jul. 22, 2016, and from which priority is claimed under all applicable sections of Title 35 of the United States Code including, but not limited to, Sections 120, 363, and 365(c), and which in turn claims priority under 35 USC 119 to Chinese Patent Application No. 201510472661.9 filed on Aug. 4, 2015 and Chinese Patent Application No. 201520580708.9 filed on Aug. 4, 2015.

TECHNICAL FIELD

The present invention relates to a robot and in particular to a multi-functional home service robot.

BACKGROUND OF THE PRESENT INVENTION

At present, the application of robots has begun to expand to various fields such as national security, special environmental service, medical assistance and scientific investigation. However, once in the intelligent era, the social network constructed by the robot industry will spread all over the fields of social production and life, and become the basis of a social form (i.e., intelligent society) resulted from a new round of industrial revolution. Most of the so-called intelligent robots on the human market are simple family toys controlled by a single-chip microcomputer, and are unable to effectively achieve real sense of high-tech artificial intelligence. Especially, all the robots on the market are unable to provide appropriate voice and image feedback and body feedback according to human voice commands.

SUMMARY OF THE PRESENT INVENTION

In order to solve the problems, a technical problem to be solved by the present invention is to provide a multi-functional home service robot with an intelligent control system.

A technical solution employed by the present invention to solve the technical problem is as follows: a multi-functional home service robot is provided, including an intelligent control system, a mechanical structure and a remote control terminal; the intelligent control system is mounted in the mechanical structure, and the intelligent control system is controlled by the remote control terminal, to cause the mechanical structure to act correspondingly; and the mechanical structure includes a head, a body, a chassis, a chassis suspension protection and movement mechanism and two movable moving-wing mechanisms, the head being mounted at an upper end of the body, and the body being mounted on the chassis; the two moving-wing mechanisms being symmetrically mounted on two sides of the body, and the chassis suspension protection and movement mechanism being mounted on the bottom of the chassis.

The present invention has the following beneficial effects: the robot of the present invention can provide appropriate voice and image feedback and body feedback according to human voice commands; the robot has functions of dust removal, sterilization, organic-matter decomposition, gas detection, air purification, autonomous navigation, autonomous acting and charging; the robot can control all-directional shooting, projection and entertainment by using an intelligent microcomputer, can carry out information storage and intelligent interaction in voice, text and image; and the robot further has functions of remote control and inspection for indoor security, and emergency alarm.

On the basis of the technical solution, the present invention can further have the following improvements.

Further, the head is connected to the body by a head rotating mechanism, the head rotating mechanism including a body fixing plate, a central sleeve, a bearing, a head turntable, a fixed seat, a compression spring, a gland nut, a fixed frame, a head DC motor, a driving wheel, a driven wheel and at least three universal balls;

the body fixing plate, having a middle portion sleeved outside a lower portion of the central sleeve, is horizontally mounted at the upper end of the body and connected to the central sleeve by the bearing;

the head turntable, the fixed seat, the compression spring and the gland nut are successively sleeved on the central sleeve above the body fixing plate from the bottom up; the head turntable is fixedly connected to the central sleeve, the fixed seat is fixed on the head turntable, and the gland nut is mounted at an upper end of the central sleeve; one end of the compression spring is resisted against the fixed seat, and the other end thereof is resisted against the gland nut;

an upper end of the fixed frame is fixed on the bottom of the body fixing plate and at a position near the central sleeve, the head DC motor is vertically fixed at a lower end of the fixed frame, and an output shaft of the head DC motor, on which the driving wheel is sleeved, is arranged in the fixed frame;

the driven wheel is sleeved on an outer side of a lower end of the central sleeve, and the driving wheel and the driven wheel are in engaged connection;

the universal balls are uniformly distributed on the head turntable, and the head is fixedly connected to the head turntable by the universal balls; and a power module and a motor driving module jointly control the operation of the head rotating mechanism to cause the head rotating mechanism to act correspondingly.

Further, each of the moving-wing mechanisms includes a moving-wing DC motor, a moving-wing DC motor mounting frame, a crank, a connecting rod, a rocker, a moving-wing, a first connecting shaft and a second connecting shaft;

the moving-wing DC motor is fixed on the moving-wing DC motor mounting frame, one end of the crank is fixedly connected to an output end of the moving-wing DC motor and the other end thereof is fixed on one end of the first connecting shaft;

one end of the connecting rod is rotationally connected to the other end of the first connecting shaft, and the other end thereof is fixedly connected to one end of the second connecting shaft;

the other end of the second connecting shaft is fixedly connected to one end of the rocker, and the other end of the rocker is fixedly connected to one end of the moving-wing; a middle portion of the rocker is rotationally connected to the moving-wing DC motor mounting frame;

the moving-wing DC motor mounting frame is fixed on the body; and a motor driving module controls the operation of the moving-wing mechanisms.

Further, the chassis suspension protection and movement mechanism includes two driving wheel structures which are symmetrically mounted on two sides of the bottom of the chassis;

each of the driving wheel structures includes a traveling motor, a driving wheel, a tension spring, a chassis swing link, a first support, a second support and a travel switch, the first support and the second support are symmetrically and vertically mounted in a groove reserved on the bottom of the chassis, and one end of the tension spring is fixedly connected to a top end of the first support and the other end thereof is fixedly connected to a top end of the second support;

the driving wheel is fixed at an output end of the traveling motor, one end of the chassis swing link is clamped on the second support and the other end thereof is fixed in the middle of the driving wheel and at a position near the motor;

the travel switch is mounted on the second support and located below the chassis swing link; when leaving the ground, the driving wheel can drive the chassis swing link to press downward, so that the travel switch is turned on; and the motor driving module controls the operation of the chassis suspension protection and movement mechanism; a global positioning module and an autonomous navigation module can control the movement track of the chassis suspension protection and movement mechanism.

Further, the robot further includes two universal wheels which are symmetrically mounted at a bottom end of the chassis and at a position near the driving wheel structure.

A touch display screen, a camera, a microphone and a protective mask are mounted on the head; and the touch display screen is mounted on an outer side of the head; the camera is mounted on the outer side of the head above the touch display screen, the microphone is mounted on the outer side of the head below the touch display screen, and the protective mask is embedded in the upper end of the head and can be exposed from the head to cover the touch display screen, the camera and the microphone; and the touch display screen, the camera and the microphone are connected to a master control board circuit.

Further, two air inlets, a tray for conveying articles, a loudspeaker box, an emergency brake button capable of cutting off the power, a projector, a purification filter cover, an air outlet, a charging device and a number of ultrasonic sensors are further mounted on the body;

the air inlets are symmetrically arranged on the two sides of the body and located below the moving-wing mechanisms;

the loudspeaker box is mounted in the middle of a front face of the body; the tray is mounted on an upper portion of the front face of the body and located above the loudspeaker box; and the tray is embedded in the body and can be pulled out of the body;

the emergency brake button, the projector, the purification filter cover, the air outlet and the charging device are successively mounted on the back of the body from the top down, the ultrasonic sensors are uniformly distributed on the outer side of the upper end of the body;

a projector module controls the operation of the projector;

the power module controls the operation of the charging device; and a loudspeaker box module controls the operation of the loudspeaker box.

Further, the intelligent control system includes a host computer master control board, a slave computer master control board, an image acquisition module for scanning an image and converting and transferring information, a sound acquisition and positioning module for acquiring and analyzing sound and processing feedback, a loudspeaker box module for reinforcing effect of a loudspeaker and toning the sound, a WiFi routing module for wireless communication with a remote control terminal, a power module, a motor driving module, a positioning and navigation module for positioning a charging point of the robot and avoiding the obstacles, a purifier module and a projector module;

the host computer master control board is mounted in the head, the slave computer master control board is mounted in the chassis, and the host computer master control board and the slave computer master control board are connected together by circuits; the image acquisition module, the sound acquisition and positioning module, the loudspeaker box module and the WiFi routing module are respectively connected to the host computer master control board by circuits; the power module, the motor driving module, the positioning and navigation module, the purifier module and the projector module are respectively connected to the slave computer master control board by circuits; and the positioning and navigation module includes a global positioning module for positioning the mechanical structure, and an autonomous navigation module for realizing the autonomous operation of the mechanical structure.

Further, the robot further includes an information acquisition and processing module which is connected to the host computer master control board by circuits;

the information acquisition and processing module includes a gyroscope, an acceleration sensor, an infrared sensor with an analog output, an infrared sensor with a digital output, a smoke sensor for monitoring the concentration of smoke for fire prevention, a CO sensor for monitoring the concentration of CO for gas leakage prevention, a $CO_2$ and formaldehyde sensor for detecting the concentration of indoor $CO_2$ and formaldehyde toxic gases, a dust sensor for monitoring the dust content, and a temperature and humidity sensor for sensing the indoor temperature and humidity; and the dust sensor and the temperature and humidity sensor are both connected to the purifier module by circuits.

Further, the robot further includes a voice interaction module which is connected to the host computer master control board by circuits and can be used for controlling the robot to receive voice information from the outside and to provide voice feedback.

With the further solution, the present invention has the following beneficial effects: the robot has functions of autonomous walking and control, voice positioning, image recognition, autonomous mapping and navigation, autonomous charging and homing, intelligent interaction in voice, text and image, article transportation, remote control and inspection for indoor security, and emergency alarm.

BRIEF DESCRIPTION OF THE DRAWINGS

FIG. 11 is a flowchart of an intelligent control system according to the present invention, in which:
1: head;
1-1: camera;
1-2: protective mask;
1-3: touch display screen;
1-4: microphone;
2: body;
2-1: air inlet;
2-2: tray for loading a disc;
2-3: loudspeaker box;
2-4: emergency brake button;
2-5: projector;
2-6: purification filter cover;
2-7: air outlet;
2-8: charging device;
2-9: ultrasonic sensor;
3: head rotating mechanism;
3-1: head DC motor;
3-2: driven wheel;
3-3: body fixing plate;
3-4: central sleeve;
3-5: head turntable;
3-6: fixed seat;
3-7: gland nut;
3-8: universal ball;
3-9: compression spring;
3-10: driving wheel;
3-11: bearing;
3-12: fixed frame;
4: moving-wing mechanism;
4-1: moving-wing DC motor;
4-2: moving-wing DC motor mounting frame;
4-3: crank;
4-4: connecting rod;
4-5: rocker;
4-6: moving-wing;
4-7: first connecting shaft;
4-8: second connecting shaft;
5: driving wheel structure;
5-1: traveling motor;
5-2: driving wheel;
5-3: tension spring;
5-4: chassis swing link;
5-5: first support;
5-6: second support;
5-7: travel switch;
6: universal wheel;
7: chassis

DETAILED DESCRIPTION OF THE PRESENT INVENTION

The principle and features of the present invention will be described with reference to the accompanying drawings, and the examples listed are merely used for explaining the present invention but not for limiting the scope of the present invention.

With reference to FIG. 1 to FIG. 7, a multi-functional home service robot is provided, including an intelligent control system, a mechanical structure and a remote control terminal; the intelligent control system is mounted in the mechanical structure, and the intelligent control system is controlled by the remote control terminal, to cause the mechanical structure to act correspondingly; and the mechanical structure includes a head 1, a body 2, a chassis 7, a chassis suspension protection and movement mechanism and two movable moving-wing mechanisms 4; the head 1 is mounted at an upper end of the body 2, and the body 2 is mounted on the chassis 7; the two moving-wing mechanisms 4 are symmetrically mounted on two sides of the body 2, and the chassis suspension protection and movement mechanism is mounted on the bottom of the chassis 7.

The head 1 is connected to the body 2 by a head rotating mechanism 3, and the head rotating mechanism 3 includes a body fixing plate 3-3, a central sleeve 3-4, a bearing 3-11, a head turntable 3-5, a fixed seat 3-6, a compression spring 3-9, a gland nut 3-7, a fixed frame 3-12, a head DC motor 3-1, a driving wheel 3-10, a driven wheel 3-2 and at least three universal balls 3-8;

the body fixing plate 3-3, having a middle portion sleeved outside a lower portion of the central sleeve 3-4, is horizontally mounted at the upper end of the body 2 and connected to the central sleeve 3-4 by the bearing 3-11;

the head turntable 3-5, the fixed seat 3-6, the compression spring 3-9 and the gland nut 3-7 are successively sleeved on the central sleeve 3-4 above the body fixing plate 3-3 from the bottom up; the head turntable 3-5 is fixedly connected to the central sleeve 3-4, the fixed seat 3-6 is fixed on the head turntable 3-5, and the gland nut 3-7 is mounted at an upper end of the central sleeve 3-4; one end of the compression spring 3-9 is resisted against the fixed seat 3-6, and the other end thereof is resisted against the gland nut 3-7;

an upper end of the fixed frame 3-12 is fixed on the bottom of the body fixing plate 3-3 and at a position near the central sleeve 3-4, the head DC motor 3-1 is vertically fixed at a lower end of the fixed frame 3-12, and an output shaft of the head DC motor 3-1, on which the driving wheel 3-10 is sleeved, is arranged in the fixed frame 3-12;

the driven wheel 3-2 is sleeved on an outer side of a lower end of the central sleeve 3-4, and the driving wheel 3-10 and the driven wheel 3-2 are in engaged connection;

the universal balls 3-8 are uniformly distributed on the head turntable 3-5, and the head 1 is fixedly connected to the head turntable 3-5 by the universal balls 3-8; and a power module and a motor driving module jointly control the operation of the head rotating mechanism 3 to cause the head rotating mechanism 3 to act correspondingly.

Figure 8:
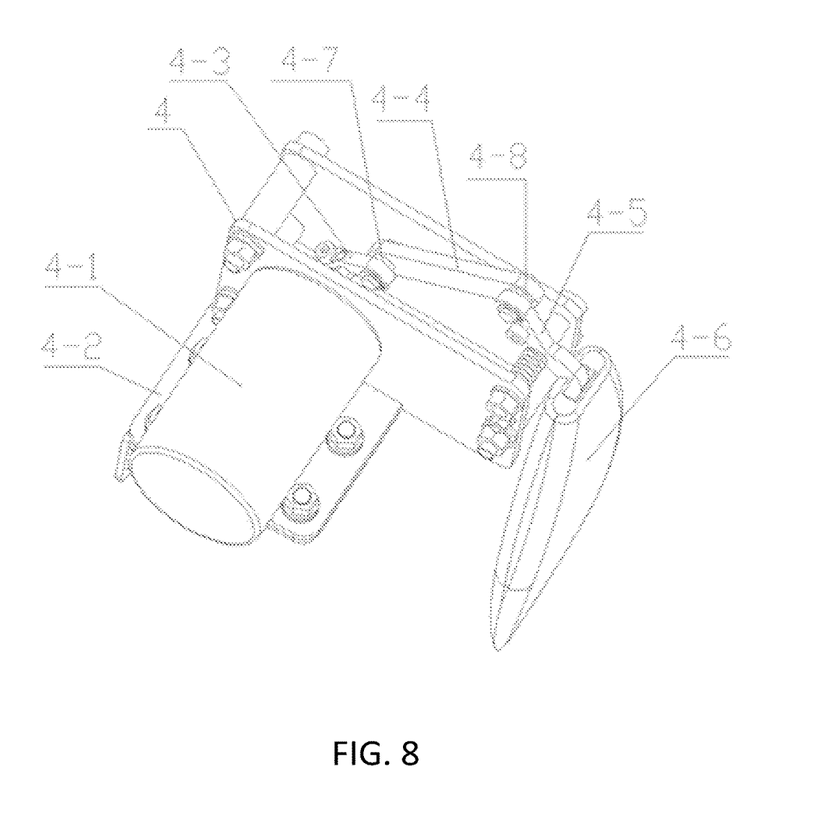
FIG. 8 is a structure diagram of a moving-wing mechanism according to the present invention.

Each of the moving-wing mechanisms 4 includes a moving-wing DC motor 4-1, a moving-wing DC motor mounting frame 4-2, a crank 4-3, a connecting rod 4-4, a rocker 4-5, a moving-wing 4-6, a first connecting shaft 4-7 and a second connecting shaft 4-8;

the moving-wing DC motor 4-1 is fixed on the moving-wing DC motor mounting frame 4-2, one end of the crank 4-3 is fixedly connected to an output end of the moving-wing DC motor 4-1, and the other end thereof is fixed on one end of the first connecting shaft 4-7;

one end of the connecting rod 4-4 is rotationally connected to the other end of the first connecting shaft 4-7, and the other end thereof is fixedly connected to one end of the second connecting shaft 4-8;

the other end of the second connecting shaft 4-8 is fixedly connected to one end of the rocker 4-5, and the other end of the rocker 4-5 is fixedly connected to one end of the moving-wing 4-6; a middle portion of the rocker 4-5 is rotationally connected to the moving-wing DC motor mounting frame 4-2;

the moving-wing DC motor mounting frame 4-2 is fixed on the body 2; and a motor driving module controls the operation of the moving-wing mechanisms 4.

Figure 9:
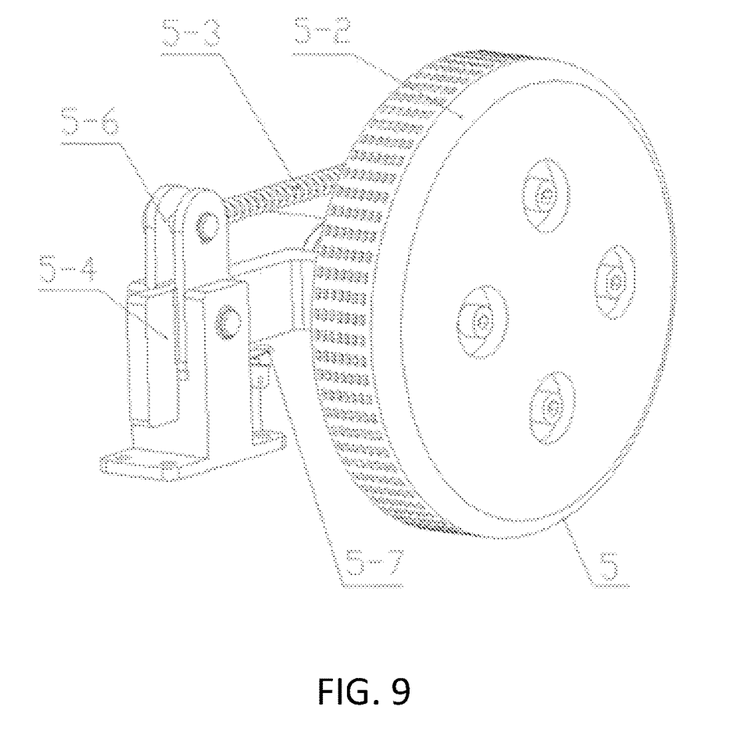
FIG. 9 is a schematic front view of a driving wheel structure according to the present invention.
Figure 10:
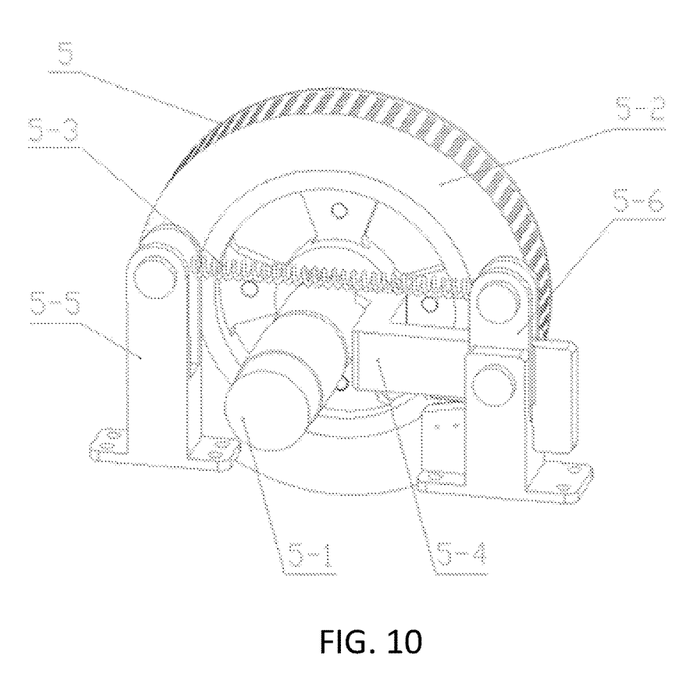
FIG. 10 is a schematic back view of the driving wheel structure according to the present invention.

The chassis suspension protection and movement mechanism includes two driving wheel structures 5 which are symmetrically mounted on two sides of the bottom of the chassis 7;

each of the driving wheel structures 5 includes a traveling motor 5-1, a driving wheel 5-2, a tension spring 5-3, a chassis swing link 5-4, a first support 5-5, a second support 5-6 and a travel switch 5-7, the first support 5-5 and the second support 5-6 are symmetrically and vertically mounted in a groove reserved on the bottom of the chassis 7, and one end of the tension spring 5-3 is fixedly connected to a top end of the first support 5-5 and the other end thereof is fixedly connected to a top end of the second support 5-6;

the driving wheel 5-2 is fixed at an output end of the traveling motor 5-1, one end of the chassis swing link 5-4 is clamped on the second support 5-6 and the other end thereof is fixed in the middle of the driving wheel 5-2 and at a position near the motor;

the travel switch 5-7 is mounted on the second support 5-6 and located below the chassis swing link 5-4; when leaving the ground, the driving wheel 5-2 can drive the chassis swing link 5-4 to press downward, so that the travel switch 5-7 is turned on; and the motor driving module controls the operation of the chassis suspension protection and movement mechanism; a global positioning module and an autonomous navigation module can control the movement track of the chassis suspension protection and movement mechanism.

The robot further includes two universal wheels 6 which are symmetrically mounted at a bottom end of the chassis 7 and at a position near the driving wheel structure 5.

Figure 1:
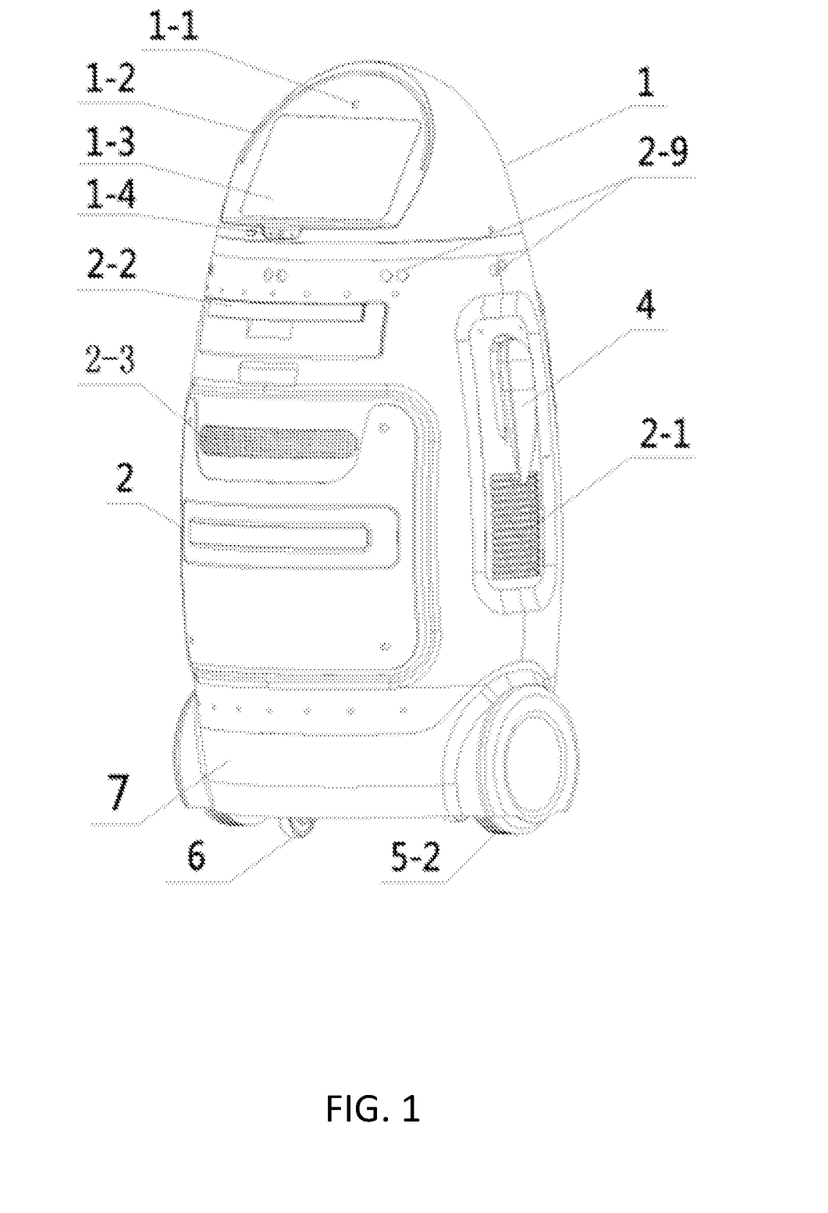
FIG. 1 is a schematic front view according to the present invention.
Figure 2:
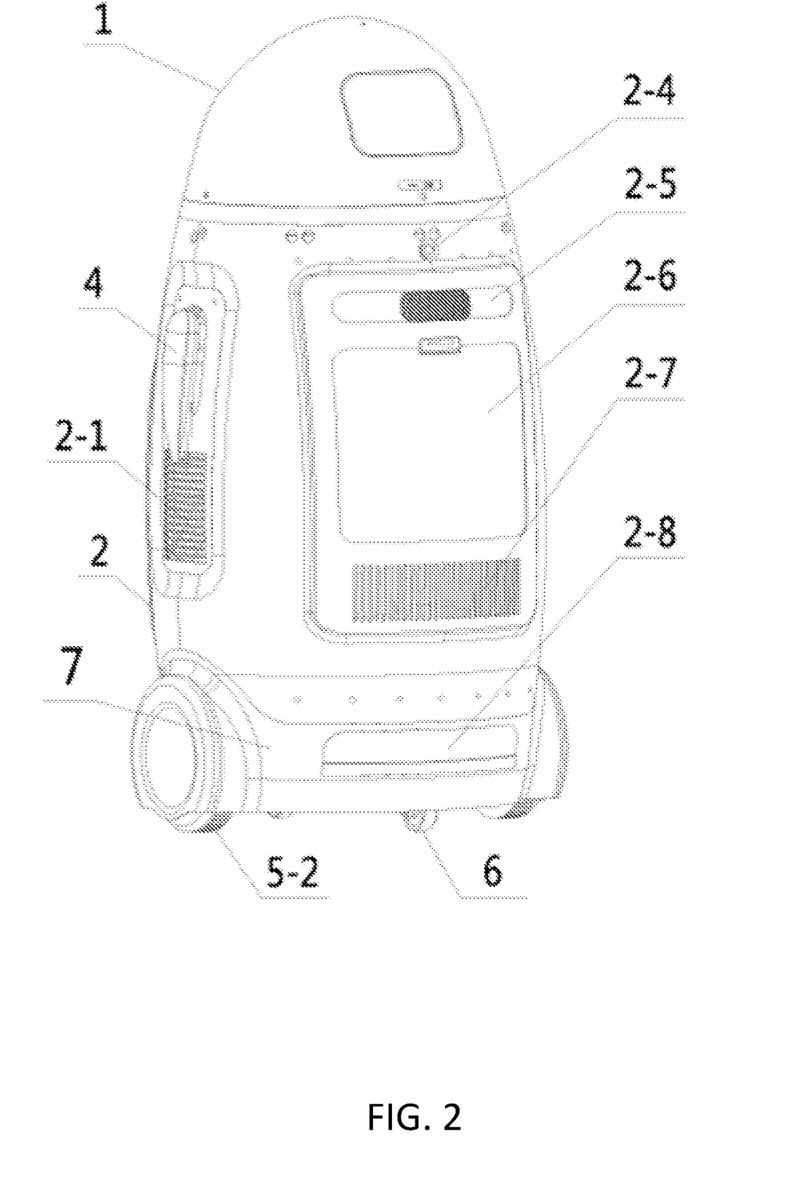
FIG. 2 is a schematic front view according to the present invention.
Figure 3:
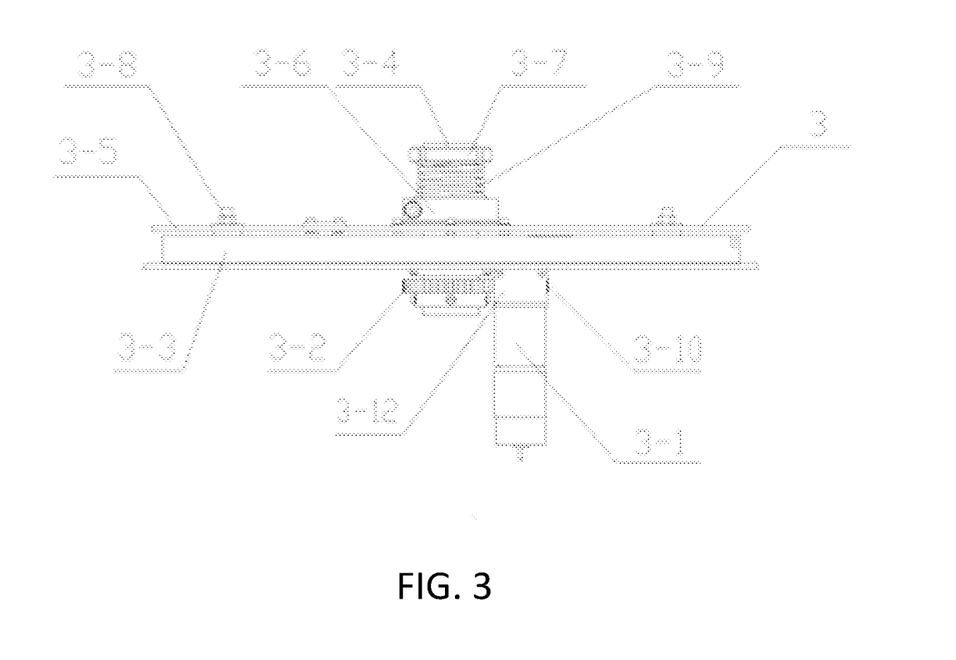
FIG. 3 is a schematic front view of a head rotating mechanism according to the present invention.
Figure 4:
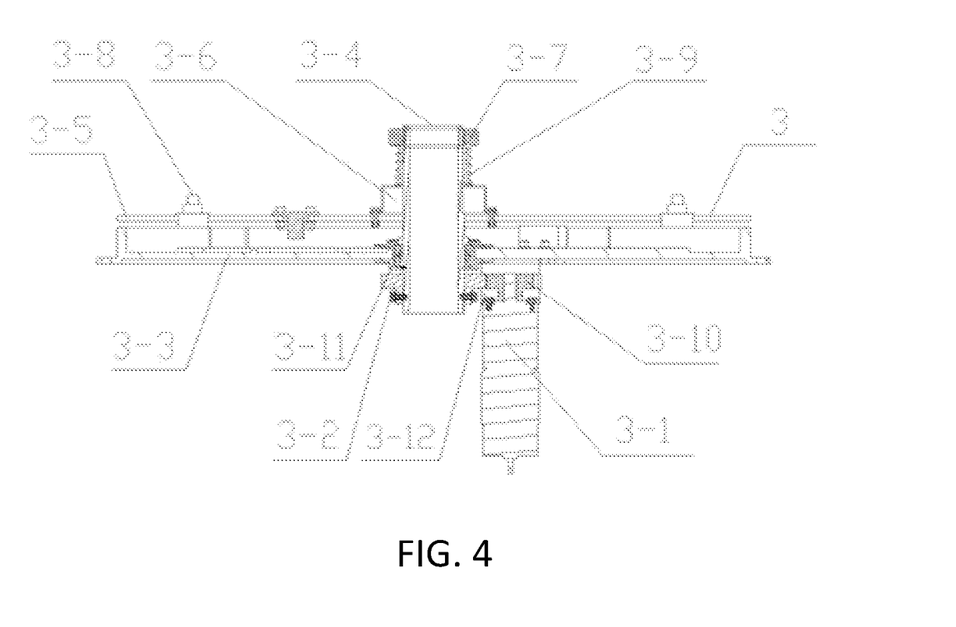
FIG. 4 is a schematic section view of the head rotating mechanism according to the present invention.
Figure 5:
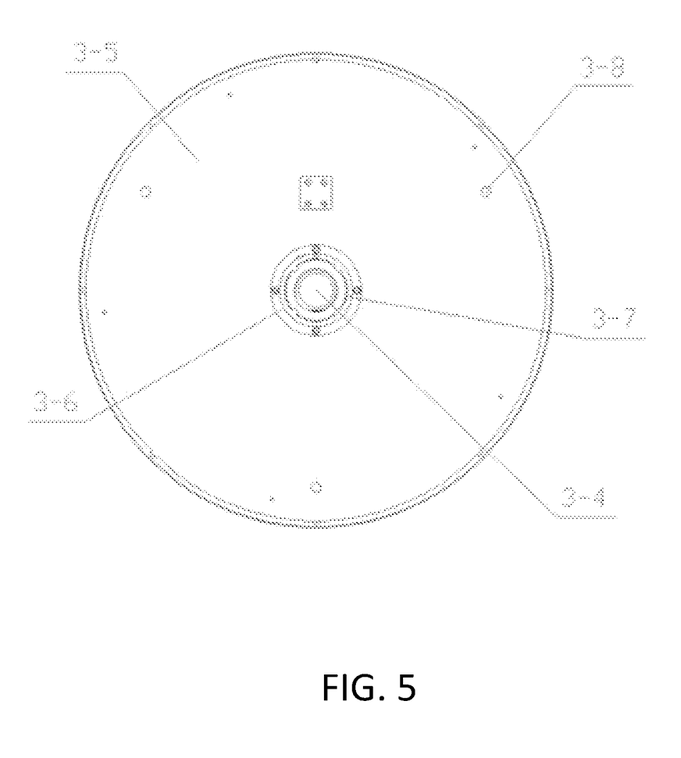
FIG. 5 is a schematic top view of the head rotating mechanism according to the present invention.
Figure 6:
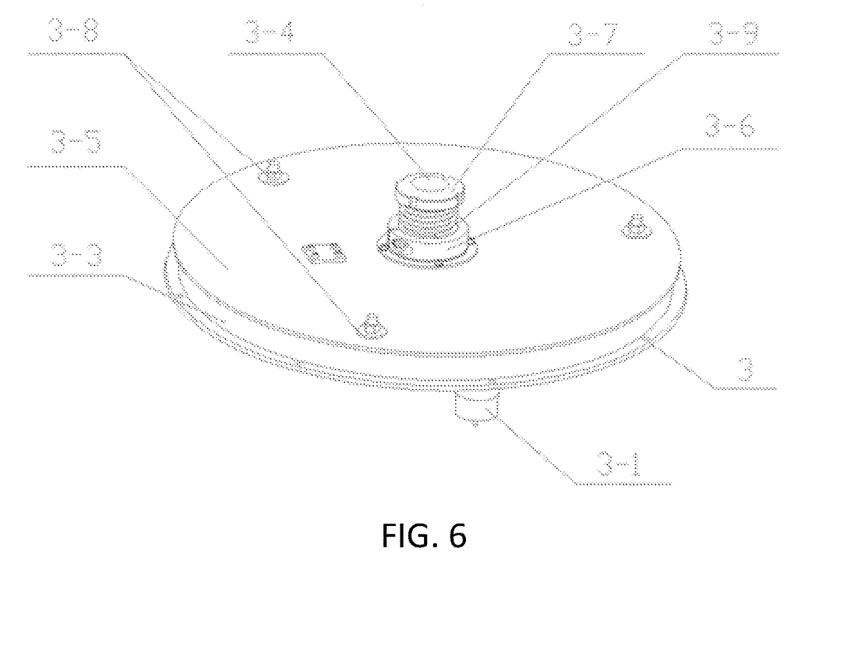
FIG. 6 is a stereoscopic structure diagram of the head rotating mechanism, when viewed from top, according to the present invention.
Figure 7:
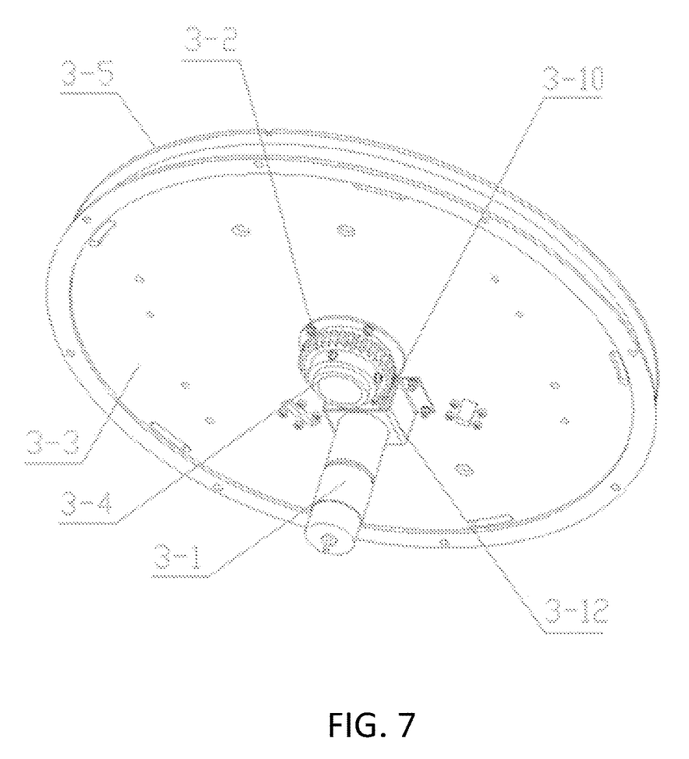
FIG. 7 is a stereoscopic structure diagram of the head rotating mechanism, when viewed from bottom, according to the present invention.

A touch display screen 1-3, a camera 1-1, a microphone 1-4 and a protective mask 1-2 are mounted on the head 1; and the touch display screen 1-3 is mounted on an outer side of the head 1; the camera 1-1 is mounted on the outer side of the head 1 above the touch display screen, the microphone 1-4 is mounted on the outer side of the head 1 below the touch display screen, and the protective mask 1-2 is embedded in the upper end of the head 1 and can be exposed from the head 1 to cover the touch display screen 1-3, the camera 1-1 and the microphone 1-4; and the touch display screen 1-3, the camera 1-1 and the microphone 1-4 are connected to a master control board circuit.

Two air inlets 2-1, a tray 2-2 for conveying articles, a loudspeaker box 2-3, an emergency brake button 2-4 capable of cutting off the power, a projector 2-5, a purification filter cover 2-6, an air outlet 2-7, a charging device 2-8 and a number of ultrasonic sensors 2-9 are further mounted on the body 2;

the air inlets 2-1 are symmetrically arranged on the two sides of the body 2 and located below the moving-wing mechanisms 4;

the loudspeaker box 2-3 is mounted in the middle of a front face of the body 2; the tray 2-2 is mounted on an upper portion of the front face of the body 2 and located above the loudspeaker box 2-3; and the tray 2-2 is embedded in the body 2 and can be pulled out of the body 2;

the emergency brake button 2-4, the projector 2-5, the purification filter cover 2-6, the air outlet 2-7 and the charging device 2-8 are successively mounted on the back of the body 2 from the top down, the ultrasonic sensors 2-9 are uniformly distributed on the outer side of the upper end of the body 2;

a projector module controls the operation of the projector 2-5;

the power module controls the operation of the charging device 2-8; and a loudspeaker box module controls the operation of the loudspeaker box 2-3.

Figure 11:
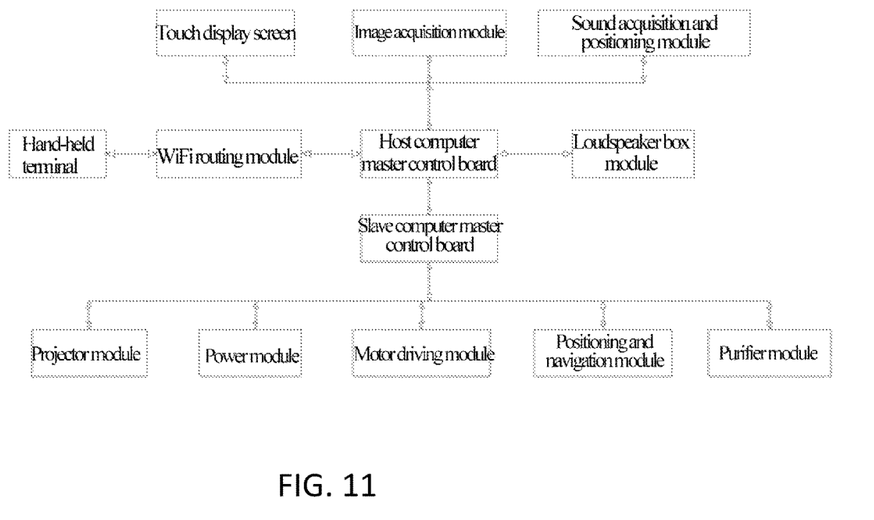

The intelligent control system includes a host computer master control board, a slave computer master control board, an image acquisition module for scanning an image and converting and transferring information, a sound acquisition and positioning module for acquiring and analyzing sound and processing feedback, a loudspeaker box module for reinforcing effect of a loudspeaker and toning the sound, a WiFi routing module for wireless communication with a remote control terminal, a power module, a motor driving module, a positioning and navigation module for positioning a charging point of the robot and avoiding the obstacles, a purifier module and a projector module;

the host computer master control board is mounted in the head 1, the slave computer master control board is mounted in the chassis 7, and the host computer master control board and the slave computer master control board are connected together by circuits; the image acquisition module, the sound acquisition and positioning module, the loudspeaker box module and the WiFi routing module are respectively connected to the host computer master control board by circuits; and the power module, the motor driving module, the positioning and navigation module, the purifier module and the projector module are respectively connected to the slave computer master control board by circuits; and the positioning and navigation module includes a global positioning module for positioning the mechanical structure, and an autonomous navigation module for realizing the autonomous operation of the mechanical structure.

The robot further includes an information acquisition and processing module which is connected to the host computer master control board by circuits;

the information acquisition and processing module includes a gyroscope, an acceleration sensor, an infrared sensor with an analog output, an infrared sensor with a digital output, a smoke sensor for monitoring the concentration of smoke for fire prevention, a CO sensor for monitoring the concentration of CO for gas leakage prevention, a $CO_2$ and formaldehyde sensor for detecting the concentration of indoor $CO_2$ and formaldehyde toxic gases, a dust sensor for monitoring the dust content, and a temperature and humidity sensor for sensing the indoor temperature and humidity; and the dust sensor and the temperature and humidity sensor are both connected to the purifier module by circuits.

The robot further includes a voice interaction module which is connected to the host computer master control board by circuits and can be used for controlling the robot to receive voice information from the outside and to provide voice feedback.

The present invention has the following working principle and working processes: since a mechanical structure of a robot is driven by an intelligent control system, the present invention can provide appropriate voice and image feedback and body feedback according to human voice commands, has dust removal, sterilization, organic-matter degradation, gas detection, air purification, autonomous navigation, autonomous action and charging and other functions simultaneously, can control all-directional camera and projection entertainment by using an intelligent microcomputer, can carry out information storage and intelligent interaction for voice, text and image, and further has functions of remote control and inspection for indoor security and emergency alarm.

The above descriptions are merely preferred embodiments of the present invention, but not for limiting the present invention. Any modification, equivalent replacement and improvement done within the spirit and principle of the present invention should be regarded as falling into the protection scope of the present invention.

The invention claimed is:

1. A multi-functional home service robot, comprising an intelligent control system, a mechanical structure and a remote control terminal; the intelligent control system is mounted in the mechanical structure, and the intelligent control system is controlled by the remote control terminal, to cause the mechanical structure to act correspondingly; and
    the mechanical structure comprises a head, a body, a chassis, a chassis suspension protection and movement mechanism and two movable moving-wing mechanisms, the head being mounted at an upper end of the body, and the body being mounted on the chassis; the two moving-wing mechanisms being symmetrically mounted on two sides of the body, and the chassis suspension protection and movement mechanism being mounted on the bottom of the chassis;
    wherein the head is connected to the body by a head rotating mechanism, the head rotating mechanism comprising a body fixing plate, a central sleeve, a bearing, a head turntable, a fixed seat, a compression spring, a gland nut, a fixed frame, a head DC motor, a driving wheel, a driven wheel and at least three universal balls;
    the body fixing plate, having a middle portion sleeved outside a lower portion of the central sleeve, is horizontally mounted at the upper end of the body and connected to the central sleeve by the bearing;
    the head turntable, the fixed seat, the compression spring and the gland nut are successively sleeved on the central sleeve above the body fixing plate from the bottom up; the head turntable is fixedly connected to the central sleeve, the fixed seat is fixed on the head turntable, and the gland nut is mounted at an upper end of the central sleeve; one end of the compression spring is resisted against the fixed seat, and the other end thereof is resisted against the gland nut;
    an upper end of the fixed frame is fixed on the bottom of the body fixing plate and at a position near the central sleeve, the head DC motor is vertically fixed at a lower end of the fixed frame, and an output shaft of the head DC motor, on which the driving wheel is sleeved, is arranged in the fixed frame;
    the driven wheel is sleeved on an outer side of a lower end of the central sleeve, and the driving wheel and the driven wheel are in engaged connection;
    the universal balls are uniformly distributed on the head turntable, and the head is fixedly connected to the head turntable by the universal balls; and
    a power module and a motor driving module jointly control the operation of the head rotating mechanism to cause the head rotating mechanism to act correspondingly.

2. The multi-functional home service robot according to claim 1, characterized in that each of the moving-wing mechanisms comprises a moving-wing DC motor, a moving-wing DC motor mounting frame, a crank, a connecting rod, a rocker, a moving-wing, a first connecting shaft and a second connecting shaft;
    the moving-wing DC motor is fixed on the moving-wing DC motor mounting frame, one end of the crank is fixedly connected to an output end of the moving-wing DC motor, and the other end thereof is fixed on one end of the first connecting shaft;
    one end of the connecting rod is rotationally connected to the other end of the first connecting shaft, and the other end thereof is fixedly connected to one end of the second connecting shaft;
    the other end of the second connecting shaft is fixedly connected to one end of the rocker, and the other end of the rocker is fixedly connected to one end of the moving-wing; a middle portion of the rocker is rotationally connected to the moving-wing DC motor mounting frame;
    the moving-wing DC motor mounting frame is fixed on the body; and
    a motor driving module controls the operation of the moving-wing mechanisms.

3. The multi-functional home service robot according to claim 2, characterized in that the chassis suspension protection and movement mechanism comprises two driving wheel structures which are symmetrically mounted on two sides of the bottom of the chassis;
    each of the driving wheel structures comprises a traveling motor, a driving wheel, a tension spring, a chassis swing link, a first support, a second support and a travel switch, the first support and the second support are symmetrically and vertically mounted in a groove reserved on the bottom of the chassis, and one end of the tension spring is fixedly connected to a top end of the first support and the other end thereof is fixedly connected to a top end of the second support;
    the driving wheel is fixed at an output end of the traveling motor, one end of the chassis swing link is clamped on the second support and the other end thereof is fixed in the middle of the driving wheel and at a position near the motor;
    the travel switch is mounted on the second support and located below the chassis swing link; when leaving the ground, the driving wheel can drive the chassis swing link to press downward, so that the travel switch is turned on; and
    the motor driving module controls the operation of the chassis suspension protection and movement mechanism; a global positioning module and an autonomous navigation module can control the movement track of the chassis suspension protection and movement mechanism.

4. The multi-functional home service robot according to claim 3, further comprising two universal wheels which are symmetrically mounted at a bottom end of the chassis and at a position near the driving wheel structure.

5. The multi-functional home service robot according to claim 4, characterized in that a touch display screen, a camera, a microphone and a protective mask are mounted on the head; and the touch display screen is mounted on an outer side of the head; the camera is mounted on the outer side of the head above the touch display screen, the microphone is mounted on the outer side of the head below the touch display screen, and the protective mask is embedded in the upper end of the head and can be exposed from the head to cover the touch display screen, the camera and the microphone; and the touch display screen, the camera and the microphone are connected to a master control board circuit.

6. The multi-functional home service robot according to claim 5, characterized in that two air inlets, a tray for conveying articles, a loudspeaker box, an emergency brake button capable of cutting off the power, a projector, a purification filter cover, an air outlet, a charging device and a number of ultrasonic sensors are further mounted on the body;

the air inlets are symmetrically arranged on the two sides of the body and located below the moving-wing mechanisms;

the loudspeaker box is mounted in the middle of a front face of the body; the tray is mounted on an upper portion of the front face of the body and located above the loudspeaker box; and the tray is embedded in the body and can be pulled out of the body;

the emergency brake button, the projector, the purification filter cover, the air outlet and the charging device are successively mounted on the back of the body from the top down;

the ultrasonic sensors are uniformly distributed on the outer side of the upper end of the body;

a projector module controls the operation of the projector;

the power module controls the operation of the charging device; and a loudspeaker box module controls the operation of the loudspeaker box.

7. The multi-functional home service robot according to claim 1, characterized in that the intelligent control system comprises a host computer master control board, a slave computer master control board, an image acquisition module for scanning an image and converting and transferring information, a sound acquisition and positioning module for acquiring and analyzing sound and processing feedback, a loudspeaker box module for reinforcing effect of a loudspeaker and toning the sound, a WiFi routing module for wireless communication with a remote control terminal, a power module, a motor driving module, a positioning and navigation module for positioning a charging point of the robot and avoiding an obstacle, a purifier module and a projector module;

the host computer master control board is mounted in the head, the slave computer master control board is mounted in the chassis, and the host computer master control board and the slave computer master control board are connected together by circuits; the image acquisition module, the sound acquisition and positioning module, the loudspeaker box module and the WiFi routing module are respectively connected to the host computer master control board by circuits; the power module, the motor driving module, the positioning and navigation module, the purifier module and the projector module are respectively connected to the slave computer master control board by circuits; and the positioning and navigation module comprises a global positioning module for positioning the mechanical structure, and an autonomous navigation module for realizing the autonomous operation of the mechanical structure.

8. The multi-functional home service robot according to claim 7, further comprising an information acquisition and processing module which is connected to the host computer master control board by circuits;

the information acquisition and processing module comprises a gyroscope, an acceleration sensor, an infrared sensor with an analog output, an infrared sensor with a digital output, a smoke sensor for monitoring the concentration of smoke for fire prevention, a CO sensor for monitoring the concentration of CO for gas leakage prevention, a $CO_2$ and formaldehyde sensor for detecting the concentration of indoor $CO_2$ and formaldehyde toxic gases, a dust sensor for monitoring the dust content, and a temperature and humidity sensor for sensing the indoor temperature and humidity; and the dust sensor and the temperature and humidity sensor are both connected to the purifier module by circuits.

9. The multi-functional home service robot according to claim 8, further comprising a voice interaction module which is connected to the host computer master control board by circuits and can be used for controlling the robot to receive voice information from the outside and to provide voice feedback.

* * * * *